US009985957B2

(12) United States Patent
Moskal

(10) Patent No.: US 9,985,957 B2
(45) Date of Patent: May 29, 2018

(54) DIGITAL CERTIFICATE WITH SOFTWARE ENABLING INDICATOR

(71) Applicant: FENWAL, INC., Lake Zurich, IL (US)

(72) Inventor: Witold Moskal, Park Ridge, IL (US)

(73) Assignee: Fenwal, Inc., Lake Zurich, IL (US)

( * ) Notice: Subject to any disclaimer, the term of this patent is extended or adjusted under 35 U.S.C. 154(b) by 0 days. days.

(21) Appl. No.: 15/636,098

(22) Filed: Jun. 28, 2017

(65) Prior Publication Data

US 2017/0302657 A1 Oct. 19, 2017

Related U.S. Application Data

(63) Continuation of application No. 14/079,324, filed on Nov. 13, 2013.

(51) Int. Cl.
| | |
|---|---|
| H04L 29/06 | (2006.01) |
| G06F 21/33 | (2013.01) |
| G06F 21/44 | (2013.01) |
| G06F 21/64 | (2013.01) |
| G06F 21/10 | (2013.01) |

(52) U.S. Cl.
CPC ........ *H04L 63/0823* (2013.01); *G06F 21/105* (2013.01); *G06F 21/33* (2013.01); *G06F 21/44* (2013.01); *G06F 21/645* (2013.01)

(58) Field of Classification Search
CPC ..... H04L 63/0823; G06F 21/33; G06F 21/44; G06F 21/105; G06F 21/121; G06F 21/10
See application file for complete search history.

(56) References Cited

U.S. PATENT DOCUMENTS

| | | |
|---|---|---|
| 6,367,009 B1 | 4/2002 | Davis et al. |
| 6,802,006 B1 | 10/2004 | Bodrov |
| 7,581,106 B1 | 8/2009 | Das et al. |

(Continued)

FOREIGN PATENT DOCUMENTS

EP 2602758 6/2013

OTHER PUBLICATIONS

Version 3 Extensions (Windows), msdn.microsoft.com/en-us/library/bb540818(v=vs.85).aspx, printed Oct. 17, 2013, 3 pages.

(Continued)

*Primary Examiner* — Linglan E Edwards
(74) *Attorney, Agent, or Firm* — Becker Patent Law, LLC

(57) ABSTRACT

A system and method of enabling software features on apheresis machines and/or infusion pumps uses a license server disposed outside of a medical facility and a local server disposed at the medical facility. The method includes generating a software enabling indicator at the license server, the software enabling indicator comprising multiple letters and a numerical code, the numerical code representing a number of licenses to be allocated for a software feature. The method includes transmitting the software enabling indicator and a certificate signing request to a third party certificate authority. The method includes transmitting the electronic document from the license server to the local server, authenticating the license server at the local server, generating a plurality of second digital certificates, transmitting the second digital certificates to each of a plurality of the medical devices and enabling a software feature on the medical devices based on the second digital certificates.

12 Claims, 3 Drawing Sheets

(56) References Cited

U.S. PATENT DOCUMENTS

| | | | |
|---|---|---|---|
| 7,707,405 B1 | 4/2010 | Gilman et al. | |
| 7,711,952 B2* | 5/2010 | Teal | G06F 21/105 713/155 |
| 7,747,851 B1 | 6/2010 | Robinson et al. | |
| 8,646,093 B2* | 2/2014 | Myers | G06F 21/105 705/59 |
| 8,725,649 B2* | 5/2014 | Gan | G06F 21/125 705/59 |
| 8,789,209 B2* | 7/2014 | Yoakum | G06F 21/121 726/29 |
| 2004/0003268 A1 | 1/2004 | Bourne et al. | |
| 2005/0182727 A1 | 8/2005 | Robert et al. | |
| 2005/0216548 A1 | 9/2005 | Wormington et al. | |
| 2006/0064582 A1 | 3/2006 | Teal et al. | |
| 2006/0206923 A1 | 9/2006 | Thompson | |
| 2006/0294366 A1 | 12/2006 | Nadalin | |
| 2007/0150418 A1* | 6/2007 | Ben-Menahem | G06F 21/10 705/59 |
| 2009/0089881 A1 | 4/2009 | Indenbom | |
| 2009/0265546 A1 | 10/2009 | Nasu et al. | |
| 2010/0251379 A1* | 9/2010 | Myers | G06F 21/105 726/26 |
| 2013/0212381 A1 | 8/2013 | Bousamra et al. | |

OTHER PUBLICATIONS

X.509 Public Key Certificates (Windows), msdn.microsoft.com/en-us/library/bb540819(v-vs.85).aspx, printed Oct. 17, 2013, 3 pages.

Decision on Appeal, Appeal 2017-000895, U.S. Appl. No. 14/079,324, Apr. 28, 2017, 12 pages.

European search report for Application No. 14189858.5-1870 dated Apr. 1, 2015, 6 pages.

* cited by examiner

DIGITAL CERTIFICATE WITH SOFTWARE ENABLING INDICATOR

CROSS REFERENCE TO RELATED APPLICATIONS

This application is a continuation of U.S. application Ser. No. 14/079,324, filed Nov. 13, 2013, which is incorporated by reference herein in its entirety.

BACKGROUND

The present application relates to enabling software features on a computing device.

Software product licensing uses several methods to ensure that only legitimate users can use the software application. These methods range from static license keys (a.k.a. serial licenses) to dedicated license servers, such as FlexNet Publisher. Current methods provide different degrees of security at the expense of deployment and maintenance complexity. While use of simple static license keys are the least complex, they offer a limited amount of protection and functionality. License servers are the most complex, while offering the highest level of protection, but are more costly. Further, in the case of a periodic license, when the expiration date is reached, the license file will be regenerated and provided by the vendor to the end user for update. Such systems do not scale well in time as the license cannot be dynamically revoked by the vendor, once it has been issued.

DETAILED DESCRIPTION OF ILLUSTRATIVE EMBODIMENTS

One or more embodiments described herein may fit between the two extremes of simple static license keys and advanced dedicated license servers to provide sufficient security while being dynamically scalable.

One or more embodiments described herein may use Secure Socket Layer (SSL) certificates that are used for authentication of connectivity on the Internet.

One or more embodiments described herein may still use a serial license key for the installation; however, they will add the ability to dynamically enable or disable system features, in both time and space, from a central corporate location down to an individual device.

One or more embodiments described herein may provide time variation capability by using changes to certificates at the corporate office, thus effectively affecting granted licenses immediately.

One or more embodiments may provide space variation capability by using changes to individual certificates, thus affecting only a single installation of the system or multiple systems at the same time.

One or more embodiments may provide protection from reverse engineering efforts of the client device's communication interface, as all functionality of the interface would be disabled until a valid certificate is received, thus preventing any communication with the device.

One or more embodiments may provide data sufficient to perform asset tracking functionality, where a local server computer would report to a corporate server certificates usage by individual devices, thus providing basic information about devices being in or out of service with a connection to specific local server host.

One or more embodiments may provide a secure licensing process, as exchange of SSL certificates may occur over a secure channel with the public key infrastructure built into the Transport Layer Security (TLS) mechanism.

One or more embodiments may provide for authentication against the server from which a certificate came, so that the authorized licensing cannot be changed or modified by unauthorized parties. The licensing mechanism itself may be protected by a digital certificate according to how SSL certificates are issued.

Figure 1:
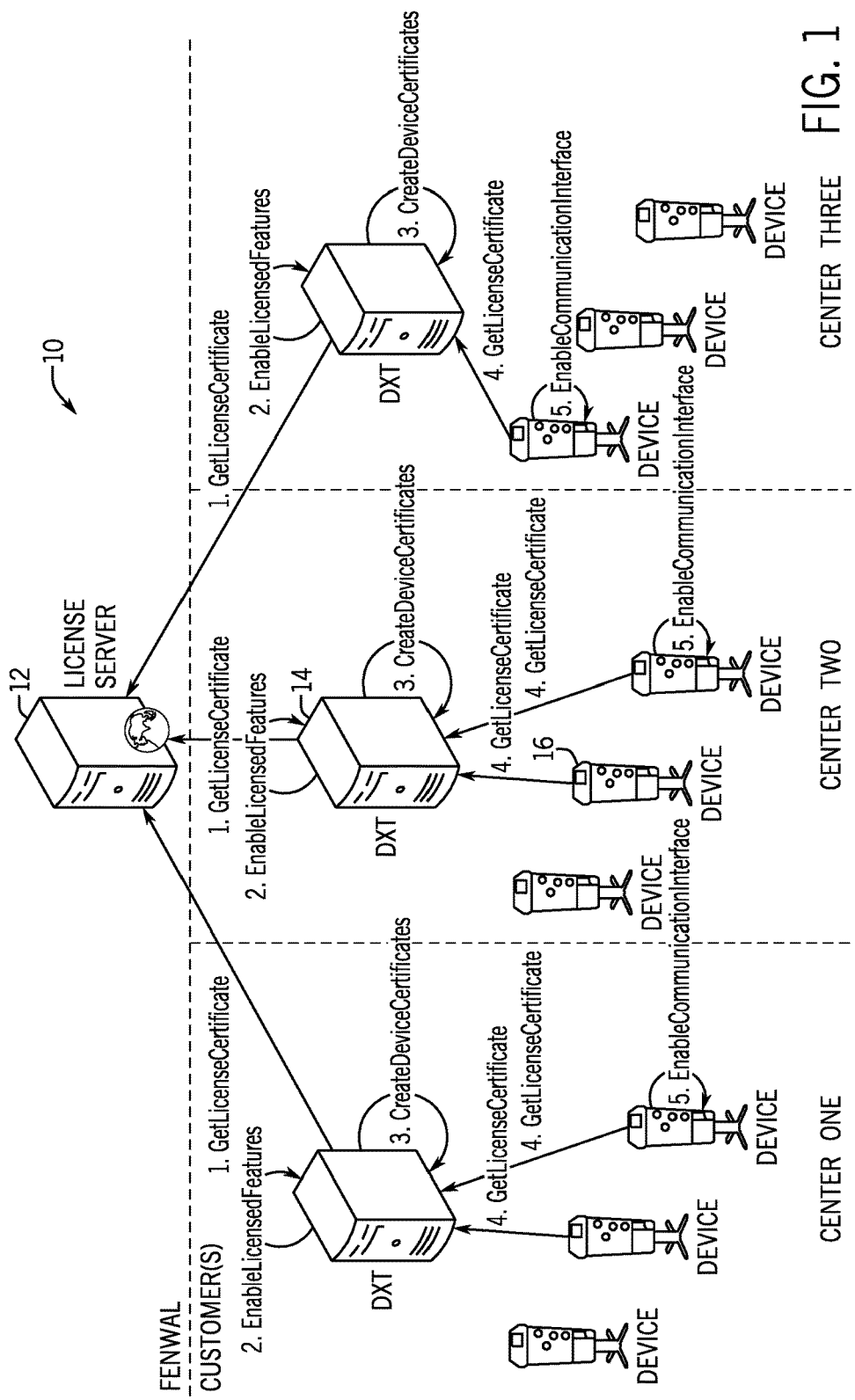
FIG. 1 is a flow diagram of a computing system for enabling software features, according to an illustrative embodiment.

Referring now to FIG. 1, a system 10 for enabling a software feature using a digitally signed electronic document is shown. In this embodiment, system 10 is illustrated as being used with a medical device 16 for performing a medical procedure on a patient, such as an apheresis machine. An apheresis machine is a machine configured to provide extracorporeal therapy to a patient by removing the patient or donor's blood, separating out one or more constituents of the blood (e.g., red blood cells, white blood cells, plasma, etc.), and returning the remaining constituents to the patient. A centrifuge device may be used for the separation. Exemplary apheresis devices include the Amicus separator, Alyx component collection system, Autopheresis-C system, and Aurora Plasmapheresis system, all manufactured by Fenwal, Inc., a Fresenius Kabi Company, Lake Zurich, Ill. In alternative embodiments, components or features of system 10 may be used with other medical devices, such as infusion pumps, patient monitors, medical imaging machines, etc., and/or with other computing devices.

Devices 16, acting as client computing devices in this illustration, are computing devices configured to operate software features. Software features can be applications, programs, extensions of a program, new versions of programs, enhancements or modifications of programs, software modules, or other software features. Different software features may provide different functions available to a user of device 16, such as a remote diagnostic feature, a remote control feature, a remote programming feature, a reporting feature for reporting data about procedures performed using device 16, remote backup and restore, new user interface features, audible alarm features, or any of a wide variety of software features. In this example, at least one, and optionally a plurality of software features are programmed into memory on device 16, for example during manufacture of device 16 or during programming of device 16 (for example by downloading software features to device 16 using a local programming computer or downloading software features from a remote server). Device 16 may be configured to enable or disable software features programmed on device 16 in accordance with authorization received from a remote device. In one example, device 16 is programmed to operate one or more basic functions without requiring further authorization. Additional functions can be selectively enabled by device 16 in response to receipt of authorization. The authorization may come in the form of a static license key, a downloaded license key, or other authorizations, such as those described below.

System 10 comprises a server computer 12 and a server computer 14, in this embodiment, though in alternative embodiments only one server computer may be used. Server computers 12 and 14 and device 16 are configured or programmed to perform steps described herein for enabling software features. In alternate embodiments, server computers 12 and 14 may be implemented on a single server computer, each implemented on a plurality of server computers, either or both implemented on a server farm, a cloud server environment, or using other computer resources. Devices 12, 14 and 16 may comprise analog and/or digital circuit components forming one or more processing circuits configured to perform the steps described herein. The processing circuit may comprise discrete circuit elements and/or programmed integrated circuits, such as one or more microprocessors, microcontrollers, analog-to-digital converters, application-specific integrated circuits (ASICs), programmable logic, printed circuit boards, and/or other circuit components. Device 16 may comprise an embedded processor, such as a processor with a dedicated function within a larger mechanical or electronic device, contrasted with a general-purpose computer, such as a personal computer (PC). One or more of devices 12, 14 and 16 may each comprise a network interface circuit configured to provide communications over one or more networks with each other and/or with other computing devices. The network interface circuit may comprise digital and/or analog circuit components configured to perform network communications functions. The networks may comprise one or more of a wide variety of networks, such as wired or wireless networks, wide area—local-area or personal-area networks, proprietary or standards-based networks, etc. The networks may comprise networks such as an Ethernet network, networks operated according to Bluetooth protocols, IEEE 802.11x protocols, cellular (TDMA, CDMA, GSM) networks, or other network protocols. The network interface circuits may be configured for communication of one or more of these networks and may be implemented in one or more different sub-circuits, such as network communication cards, internal or external communication modules, etc.

In this illustrative embodiment, server computer 12, acting as a software enabling server or licensing server, is configured to transmit over the network an electronic document comprising a digitally signed identity associated with the server computer. The electronic document comprises a software enabling indicator, the software enabling indicator comprising data indicating whether a software feature of a system is to be enabled for use. The electronic document may be a digital certificate configured for establishing the authenticity of the identity of the server computer to a remote device. A digital certificate (or identity certificate or public key certificate) is an electronic document that uses a digital signature to bind a key with an identity. An identity is data such as the name of a person or an organization, their address, a nickname, a trade name, or any other code which a person or organization may use to identify itself. A digital certificate can be used to verify that a key, such as a public key, belongs to that person or organization. The digital signature binds the key with the identity through any of a variety of strong or weak cryptographic mechanisms, such as a hash function, RSA encryption, the Rabin signature algorithm, the BLS signature scheme, or any other technique for digitally signing an identity.

The software enabling indicator is data that is used by the receiving computer of the digital certificate to determine whether a software feature is to be enabled. For example, the software enabling indicator may indicate that one or more client computing devices are licensed (e.g., pursuant to a software license agreement) to use the software feature. In one example, a software enabling indicator may be a one-bit digital flag (e.g., "1" or "0", "yes" or "no", etc.) in a field of a data structure known by the receiving computer to represent a particular software feature. In another example, the software enabling indicator may include a multi-character or multi-digit code representing the name of a software feature along with an indication as to whether the software feature is to be enabled (e.g., "yes" or "no", "enable" or "disable", "licensed" or "not licensed.") In one embodiment, the software enabling indicator is part of the electronic document that is digitally signed. In other embodiments, the electronic document comprising the digitally signed identity may contain the software enabling indicator in an un-signed portion of the document.

The software enabling indicator in some embodiments may be a license key or product key, such as a static license key. A product key consists of a series of numbers and/or letters. This sequence is typically entered by the user during the installation of computer software, and is then passed to a verification function in the program on the client computer. This function manipulates the key sequence according to a mathematical algorithm and attempts to match the results to a set of valid solutions.

Figure 2:
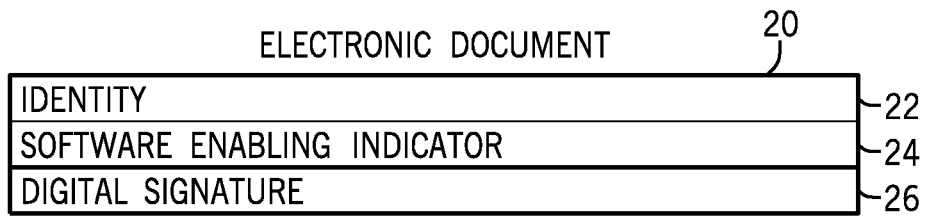
FIG. 2 is a diagram illustrating an electronic document having a digitally signed identity, according to an illustrative embodiment.

Referring now to FIG. 2, an illustrative electronic document will be described. Electronic document 20 comprises an identity data or code 22 in a first field and a software enabling indicator 24 in a second field. In this example, both identity 22 and indicator 24 are digitally signed using digital signature 26. Other data, codes, fields or extensions may be used in various embodiments of an electronic document.

Figure 3:
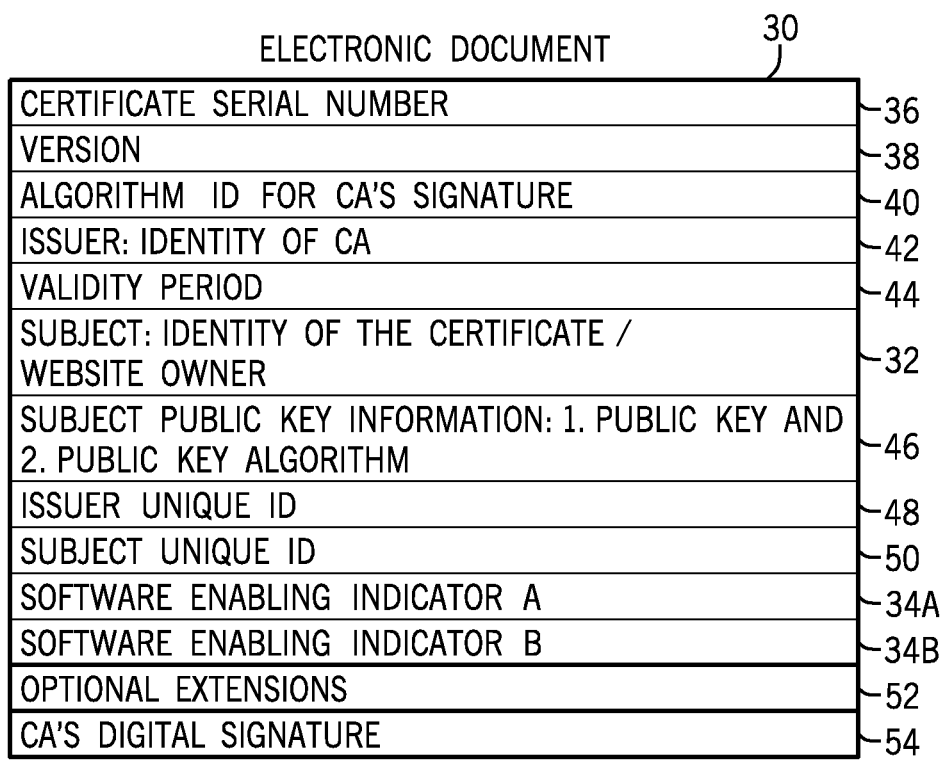
FIG. 3 is a diagram illustrating an electronic document having a digitally signed identity, according to another illustrative embodiment.

Referring now to FIG. 3, an alternative electronic document will be described to illustrate a number of additional data elements that may be part of electronic documents in alternative embodiments. Electronic document 30 comprises an identity in the form of a subject 32 representing the identity of the certificate or website owner of the server computer that is transmitting the electronic document to the client computer. Document 30 further comprises a plurality of software enabling indicators 34A and 34B representing different software features to be enabled/disabled and perhaps in different formats (e.g., single bit, multi-character, etc.). Document 30 further comprises: a certificate serial number 36, a unique identifier for this particular document 30 for use in distinguishing it from other documents; a version number 38 which can be used for duplicate copies of the same document 30 having minor changes (such as a renewed validity period, change in software enabling indicators, etc.); an algorithm ID 40 indicating a cryptographic algorithm that was used to bind a certificate authority's (CA) digital signature (CA digital signature 54) to document 30; another identity 42, this identity representing the name of the certificate authority who digitally signed document 30 for use by the client computer in determining whether the CA is in a predetermined list of trusted CAs; a validity period 44 which comprises one or more validity dates, a validity date indicating a start date or end date of a period during which document 30 is valid and usable by client computer for authentication; public key information for the subject 46, which may comprise a public encryption key and a public key algorithm used with the public key; issuer unique ID 48 and subject unique ID 50 are additional optional identity fields; and optional extensions 52 represents any of a number of additional data fields that may be inserted within electronic document 30.

In one example, the electronic document may be a Secure Socket Layer (SSL) certificate. The electronic document may be formatted in accordance with the X.509 standard from the ITU Telecommunication Standardization Sector. An SSL protocol may determine variables of the encryption for both the link and the data being transmitted. Communication of the electronic document may be in accordance with one or more steps of a SSL transmission protocol, such as that described below:

1. The client computer (e.g., operating a web browser) connects to a server computer (e.g., operating a website) secured with SSL at a URL preceded by https. The client computer requests that the server identify itself.

2. The server computer sends a copy of its SSL certificate, including the server's public key.

3. The client computer checks the issuer ID (also called the certificate root) against a list of trusted issuers (e.g., CAs). The client computer also checks that the certificate has not expired or been revoked. If the client computer trusts the certificate, it creates, encrypts, and sends back a symmetric session key using the server's public key. The symmetric session key is used for subsequent secure communication between server and client instead of the public key because use of the session key provides faster encryption/decryption of messages.

4. The server computer decrypts the symmetric session key using its private key and sends back an acknowledgement encrypted with the session key to start the encrypted session.

5. The server computer and client computer now encrypt all transmitted data with the session key.

Referring again to FIG. 1, an illustrative system and method for enabling software features on devices 16 will be described. In this example, a two-step licensing model is implemented, where server 14 will obtain its licenses from a corporate license server 12, and individual devices 16 will obtain their licenses by communicating with server 14. License server 12 may be implemented with a hypertext transfer protocol (HTTP) to provide self-signed SSL certificates to all instances of servers 14 (three are shown, though more or less are contemplated), in response to periodic requests from servers 14. In addition to other content (such as that shown in FIGS. 2 and 3), the SSL certificates will include information about licensed features. When server 14 receives a valid SSL certificate, it will determine what features of server 14 can be enabled. If a valid certificate is not received, server 14 will disable licensed features and will operate only basic free functions. This will enable a manufacturer or servicer of devices 16, as a certificate authority, to dynamically grant or revoke licensed features by modifying SSL certificates with desired information (e.g., software enabling indicators) from the corporate location at any time. Once server 14 verifies its own licenses, it is configured to act as a proxy of license server 12 to connected devices 16.

According to one embodiment, the device communication interface (e.g., network communication circuit) on each of devices 16 may be configured to remain disabled until it receives a valid certificate from server 14. Once a valid certificate is received, device 16 is configured to enable its communication interface, for example for a specific period of time or until it is powered off. When the device communication interface is enabled, server 14 will be able to communicate with device 16 to retrieve data (for example regarding medical procedures performed, regarding software features enabled/disabled, etc.), get status information about device 14, set the device's configuration, etc.

Server 12 comprises a processing circuit configured to generate, request, and/or store an electronic document having a digitally signed identity. Server 12 may perform these steps locally on server 12 or may use a local or remote authentication or signing server. For example, server 12 may be configured to generate a certificate signing request (CSR) document and transmit the CSR to a certificate issuer or CA, such as DigiCert, Verisign, Entrust, etc. The CSR may be in a standardized format, such as Pkcs#10 or Spkac, or in a customized format. This CSR creates a private key and a CSR data file that is sent to CA. The CA uses the CSR data file to create a public key to match the private key without compromising the key itself. The electronic document returned by the CA is digitally signed by the CA. The CA is one that server computer 14 and/or device 16 recognize as a trusted CA. The CA may be a third party, or a manufacturer or servicer of devices 16. An SSL Certificate issued by a CA to an organization and its domain/web site verifies that a trusted third party has authenticated that organization's identity.

Server 12 may be configured to embed or store the software enabling indicator or indicators (e.g., license key) in the electronic document before the electronic document is digitally signed. Extensions or other data may also be inserted or stored in the electronic document before it is digitally signed. Alternatively, software enabling indicators, extensions or other data may be appended to the digitally signed electronic document after signature.

Server computer 14 may be configured to periodically, intermittently, synchronously or asynchronously request communication with server computer 12. Alternatively, server 12 may make the request for communication of computer 14. In either case, server 12 may transmit the previously generated electronic document to server computer 14. The electronic document may be transmitted each time there is communication first being established between server 14 and server 12 (e.g., upon power-up of device 16, server 14 and/or server 12, each time there are interruptions in the communication link, once per day, etc.). Server computer 14 may be configured to authenticate server computer 12 using the electronic document, for example using SSL techniques or other techniques. If authentication is successful (e.g., a valid certificate is received, having a proper validity date, trusted CA, etc.), server 14 is configured to read the software enabling indicator(s) and to carry out the instructions represented by the indicator(s). For example, if a software enabling indicator indicates that a license to use a software feature has expired, server 14 may be configured to disable that software feature on one or more of devices 16, per the instructions. As another example, if a software enabling indicator indicates that a license to use a software feature is now in place, server 14 may be configured to enable that software feature on one or more of devices 16.

In one embodiment, the validity date 44 of the electronic document may be used by server 14 both for representing a date after which the server computer can no longer be authenticated using this electronic document and for determining when the software feature is no longer enabled for use. In alternate embodiments, the software enabling indicator may separately specify a validity date for a software feature. In either event, server 14 may be configured to store in memory an indication of software features that are to be enabled, the number of licenses available, device 16 IDs that are to be enabled and a priority thereof, and/or other data useful for enabling and disabling software features based on the electronic document received from server 12.

Server 14 may be configured to communicate over wired or wireless connections with devices 16, and may use encrypted or unencrypted communication techniques. In one embodiment, server 14 may be configured to generate a plurality of electronic documents, each comprising a digitally signed identity associated with the server computer 14, the plurality of electronic documents each comprising a second software enabling indicator based on the first software enabling indicator received from server 12. In this manner, server computer 14 acts as a proxy for server 12. Server 14 may be configured to transmit one of the plurality of electronic documents to each of a plurality of remote computing devices 15 for use in enabling a software feature on each of the remote computing devices 16. Server 14 may digitally sign the electronic documents itself or may use a third party computer or even server computer 12 as a certificate authority for signing the electronic documents.

According to some embodiments, server computer 14 may be configured to receive a first digital certificate having a software enabling code from a remote computer server over the network, generate a plurality of second digital certificates based at least in part on the software enabling code, and transmit the second digital certificates to each of a plurality of client computing devices to be used by each client computing device to enable a software feature. For example, the digital certificate received by server computer 14 may specify a number of licenses that server computer 14 is authorized to pass along to devices 16. Server computer 14 may be configured to prioritize which devices 16 receive licenses. Server computer 14 may be configured to reallocate a license from one device 16 not in operation at the time to another device which is in operation at the time. Server computer 14 may be configured to generate one digital certificate for enabling the first software feature and another digital certificate for enabling a second software feature different than the first software feature. Each enabling code may comprise data regarding the number of licenses server 14 may allocate for that feature, e.g., software feature A=100 licenses; software feature B=10 licenses. Server computer 14 may be configured to allocate licenses based on care area, for example, intensive care unit, primary care unit, neonatal care unit, floors or areas of a hospital building, etc.

In one example, the electronic document from server 12 to server 14 could include user-defined fields or areas. Such fields could add to the information a differentiation of licenses based on the center to which device 16 belongs. One server 14 may serves more than one center with different devices. The license user-defined data space could include the center name and the features and the license keys for a first center name and a center name, features and license keys for a second center with different license keys than the first center. Further, server 14 could generate certificates for individual devices 16 based on a single certificate generated for the center, and potentially for the whole medical facility.

As discussed, device 16 may be configured to block, prevent, or reject any attempt from outside device 16 for communication unless device 16 receives a certificate it can verify with an authentic server. Device 14 may function similarly. Typically in medical devices and embedded devices, the protocols are proprietary; so in order for a hacker or spoofer to understand what to send, they would need to have protocol-specific specifications. By preventing communication absent a valid certificate, even if an attempted spoofer was able to get the correct protocol specifications for communication with server 14 or device 16, the spoofer will not be able to communicate because it does not have a valid certificate. Thus, an added layer of security may be provided.

Figure 4:
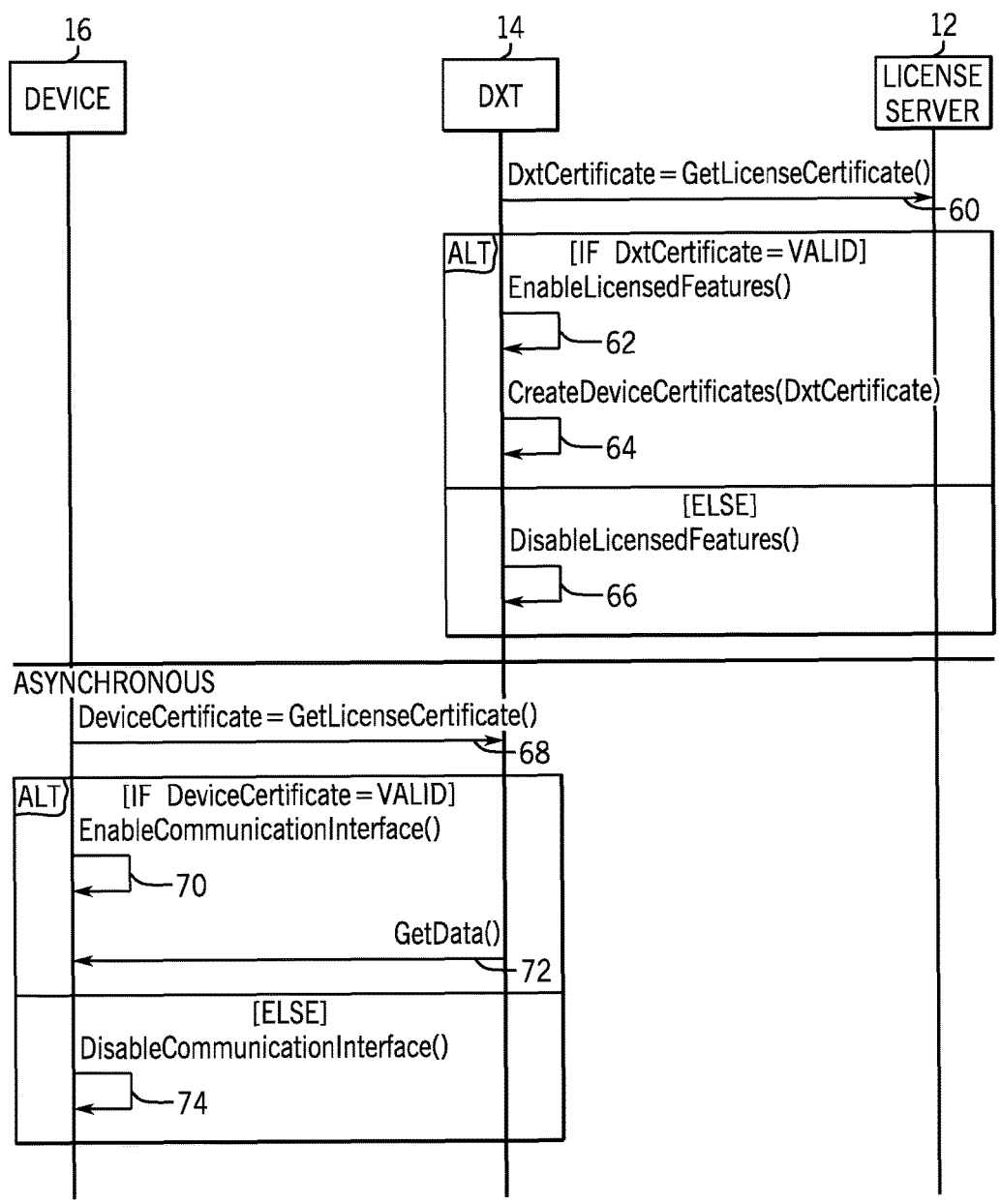
FIG. 4 is a sequence diagram illustrating electronic document transmissions, according to illustrative embodiments.

Referring now to FIG. 4, a sequence diagram illustrates steps in communication among device 16, server 14 and server 12. In a step 60, server 14 is configured to transmit a GetLicenseCertificate( ) request message to server 12. This message may be an initial request for communication with server 12, submitted according to a TCP/IP protocol. Server 12 is configured to receive the request and generate and/or provide a digital certificate DXTCertificate as described herein to server 14. Server 14 is configured to determine whether the digital certificate is valid by comparing one or more of the certificate authority to a prestored list of trusted CAs, the validity date to an actual date of receipt of the digital certificate, and/or other items within the digital certificate. If the digital certificate is valid, server 14 is configured to enable licensed software features at step 62. If the digital certificate is valid, server 14 may further be configured to generate device certificate(s) for device(s) 16 at step 64. If one or more of the digital certificate validity checks does not indicate a positive result or that the digital certificate is valid, server 14 is configured to disable or not enable certain software features at step 66. For example, if the software feature for a device is one that was previously enabled and now is no longer enabled, server 14 may be configured to generate and send a new digital certificate to device 16 with an expired validity date as a way of indicating to device 16 that the software feature is invalid. In another example, server 14 may be configured to simply not enable the software feature on device 16 if it has not yet been enabled. Other methods of disabling or not enabling a software feature based on an invalid digital certificate received at server 14 are contemplated.

At step 68, device 16 may be configured to transmit a GetLicenseCertificate( ) message to server 14 to request an enabling message (such as a digital certificate or other enabling code) for a software feature or features to be authorized for use on device 16. The message may be sent asynchronously, such as when a device is powered on by a human operator, after a power outage or other cycling of power, etc. Alternatively, the message may be sent synchronously, such as once per hour, once per day, etc. In response, server 14 may be configured to generate and/or provide a digital certificate to device 16 comprising a software enabling code and/or other elements of a digital certificate described herein. Device 16 comprises programming configured to determine if the DeviceCertificate provided by server 14 is valid, again by comparing one or more elements to other data, such as the certificate authority, validity date, etc. If the digital certificate is valid, the communication interface circuit of device 16 is enabled at step 70 for additional communication, represented by the GetData( ) function (steep 72), which is a generic function showing that once a valid certificate is in place, data transfer(s) related to licensed functionality may occur. If the digital certificate is not valid, the communication interface circuit remains disabled (step 74) (to communications beyond requesting and receiving the digital certificate) so as not to allow communications from a potential spoofer. With a valid digital certificate, device 16 is configured to enable the software feature or features specified by the digital certificate. The software features may then be operable on device 16 for use by human operators, patients, clinicians, etc.

While some embodiments herein are described with reference to use with medical devices, the teachings herein may be implemented in other fields as well, such as Internet web browsing, manufacturing, point-of-sale computers, and a wide range of other computing environments.

The invention claimed is:

1. A method of enabling software features on medical devices comprising apheresis machines and/or infusion pumps using a license server disposed outside of a medical facility and a local server disposed at the medical facility, the method comprising:
   generating a software enabling indicator at the license server, the software enabling indicator comprising multiple letters and a numerical code, the numerical code representing a number of licenses to be allocated for a software feature;
   transmitting the software enabling indicator and a certificate signing request to a third party certificate authority;
   receiving a digitally signed electronic document containing the software enabling indicator at the license server, the digitally signed electronic document further comprising a name of the certificate authority that digitally signed the document;
   transmitting the digitally signed electronic document from the license server to the local server disposed at the medical facility;
   authenticating the license server at the local server using the digitally signed electronic document;
   generating at the local server a plurality of second digital certificates based at least in part on the software enabling code;
   transmitting the second digital certificates to each of a plurality of the medical devices;
   determining at the medical devices whether the certificate authority of the received second digital certificates is on a list of trusted certificate authorities;
   enabling a software feature on the medical devices based on the second digital certificates.

2. The method of claim 1, further comprising:
   generating a symmetric session key at one of the medical devices using a public key from the local server;
   transmitting the symmetric session key to the local server;
   using the symmetric session key for secure communication between the one of the medical devices and the local server.

3. The method of claim 2, further comprising:
   using the symmetric session key to transmit status information about the one of the medical devices to the local server; and
   using the symmetric session key to set a configuration for the one of the medical devices from the local server.

4. The method of claim 3, further comprising:
   comparing a validity date of one of the second digital certificates to an actual date of receipt of the one of the second digital certificates;
   determining whether the one of the second digital certificates is valid based on whether the third party certificate authority of the received one of the second digital certificates is on a list of trusted certificate authorities and based on the step of comparing the validity date to the date of receipt of the one of the second digital certificates.

5. The method of claim 4, wherein the digitally signed electronic document comprises a validity date, the validity date of the digitally signed electronic document used by the local server both for representing a date after which the license server can no longer be authenticated using this electronic document and for determining when the software feature is no longer enabled for use.

6. The method of claim 4, further comprising asynchronously transmitting a request for a digitally signed electronic document from one of the medical devices to the local server.

7. The method of claim 6, further comprising:
   receiving a third digital certificate at the local server, the third digital certificate comprising a software disabling code;
   transmitting fourth digital certificates to the medical devices to disable the software feature on the medical devices.

8. The method of claim 7, further comprising reallocating a license from one medical device not in operation at the time to another medical device which is in operation at the time.

9. The method of claim 8, wherein the software enabling code comprises an indication of a first license for an intensive care unit of the medical facility and a second license for a primary care unit of the medical facility.

10. The method of claim 9, the medical devices operating basic functions without requiring authorization.

11. The method of claim 10, the medical devices operating basic functions after the software feature is disabled based on the fourth digital certificates.

12. The method of claim 1, wherein the third party certificate authority is other than a manufacturer or services of the medical devices.

* * * * *